May 29, 1928.

H. JOHNSON

FRUIT PITTING KNIFE

Filed Sept. 2, 1926

1,671,587

INVENTOR.
HENRY JOHNSON
BY White & Prost
his ATTORNEYS.

Patented May 29, 1928.

1,671,587

UNITED STATES PATENT OFFICE.

HENRY JOHNSON, OF SUNNYVALE, CALIFORNIA, ASSIGNOR TO FRANK ROBBINS, OF SAN FRANCISCO, CALIFORNIA.

FRUIT-PITTING KNIFE.

Application filed September 2, 1926. Serial No. 133,157.

My invention relates to knives operated usually by power for severing the pits or stones from peaches and similar fruits, and relates particularly to knives which are useful in severing the pits from fruit which has previously been halved.

With the enormous growth of the canning and preserving industry, it has become necessary to handle large quantities of fruit in a short time. This is particularly true of the deciduous fruits which are ripe for only a short season and do not retain their matured, edible conditions unless artificially preserved. The markedly seasonal character of the canning industry has resulted in the employment of large numbers of manual laborers to care for and prepare the fruit for canning and preserving and also has resulted in the development of various machines which are designed to eliminate some of the hand work.

Peaches are typical of the fruit mentioned and they form a large percentage of the produce which must be especially prepared for packing. In the following description, I shall disclose my invention as it is applied to the handling of peaches. It is to be understood that I do not intend to limit myself to peaches alone but refer to peaches merely as a convenient example.

At the present time, the operation of pitting or severing the pit from the tissue or fleshy part of the peach is largely carried on by hand. Machines have been developed to accomplish automatically the pitting of peaches and as an example thereof I refer to the machine disclosed in Patent Number 1,387,183 and issued to Frank Robbins on August 9, 1921. This patent shows a machine using a semi-circular knife sharpened along its leading edge and adapted to scoop out the pit portion of the peach by being rotated a half-revolution on an axis parallel to the axis of the peach.

There are some disadvantages connected with the operation of a knife of the semi-circular type. The entire cutting edge enters the peach at once and throws a sudden strain on the sometimes delicate mechanism and tends to dislodge the peach-half from its holder. The entire cutting edge emerges from the peach at once and is apt to tear the unsupported fibres adjacent the surface of the fruit. Moreover, the only possible cut is one substantially hemispherical in form and must be of sufficient size to encompass the greatest diameter of the pit. When successive peach pits are widely variant in size, either the knife must cut out and waste good portions of the fruit or it will strike the pit, breaking off portions thereof and embedding them in the edible portion of the fruit. This is particularly likely to be the case since the pit has been sawed in two and it is prone to crumble under such treatment. Quantities of otherwise good fruit have been spoiled by embedded particles of the broken pit.

It is therefore an object of my invention to provide a fruit pitting knife especially adapted for use with peaches and similar fruits which will not tear the tissue or flesh of the fruit.

Another object of my invention is to provide a fruit pitting knife for use with previously halved peaches in which most of the shearing force of the cutter is directed away from the cut portions.

An additional object of my invention is to provide a fruit pitting knife in which the initial portion of the pit severing cut is made at a relatively slow rate.

A further object of my invention is to provide a rotatable fruit pitting knife in which a complete revolution of the knife is utilized for effecting the pit severing cut.

A still further object of my invention is to provide a fruit pitting knife in which the cutting portion of the knife can be guided to follow the contour of the pit.

The invention possesses other advantageous features, some of which with the foregoing, will be set forth at length in the following description where I shall outline in full that form of the knife of my invention, which I have selected for illustration in the drawings accompanying and forming part of the present specification. In said drawings I have shown one form of knife embodying my invention, but it is to be understood that I do not limit myself to such form since the invention, as set forth in the claims, may be embodied in a plurality of forms.

Broadly speaking, the knife of my invention preferably comprises a rotatable cutting portion having a helicoidal shape.

Figure 4:
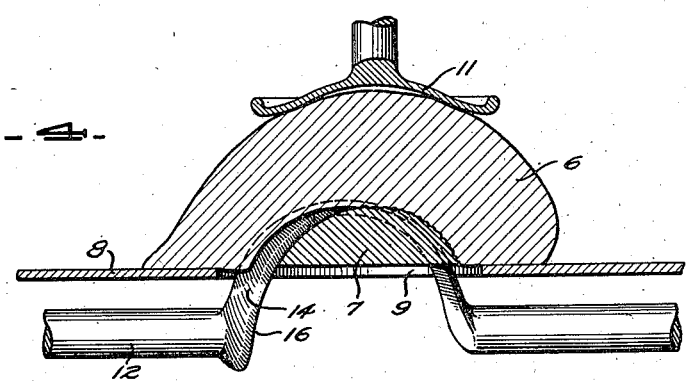
Fig. 4 shows the knife in the process of severing the pit from a peach, portions of the figure being shown in cross section.

In Figure 4 of the drawings the knife is shown as it might appear in the Robbins machine above referred to or in a similar machine particularly developed for utilization of the knife. In this machine, the peach half 6 containing the half pit 7 is held with the cut portion abutting a plate 8. The plate is a smooth plane against which the peach half 6 can fit snugly. It is provided with an aperture 9 approximately the shape of a peach pit and sufficiently large to encompass peach pits of the usual size. The peach is retained in place and is pressed against the plate 8 by means of a presser 11, urged against the peach by means of a spring or other mechanism. Beneath the plate and substantially directly under the aperture 9, the knife of my invention is located. The knife comprises a shaft 12 suitably journalled parallel with the axis of the peach 6. The shaft is arranged to be driven in the direction of the arrow 13 by suitable rotating mechanism. Intermediate the journalled portions of the shaft 12 a helicoidal cutter portion or blade 14 is formed. The exact shape and contour of the helicoidal blade 14 can be varied within wide limits to suit the particular variety of fruit being treated, but in the present instance it is esspecially adapted for use with peaches. The blade is shaped to conform approximately to a helicoidal strip of the surface of an ellipsoid of revolution and is sharpened on its leading edge 16. It will be seen from Fig. 4 that upon rotation of the shaft 12, the blade will rotate with the shaft and enter the fruit adjacent one end of the pit 7. The blade follows closely the contour of the pit and after a complete rotation of the shaft, the entire blade has passed thru and emerged from the fruit. The pit is completely severed from the tissue or fleshy portion of the fruit. The cut made by the knife in severing the pit from the fruit is substantially half of a spheroid and in the claims has been termed hemispheroidal. In the terms hemispheroidal, ellipsoid of revolution, and helicoidal strip as used in the claims, I wish to include their broad mathematical meanings and not limit myself to any particular or exact geometrical shape.

Figure 1:
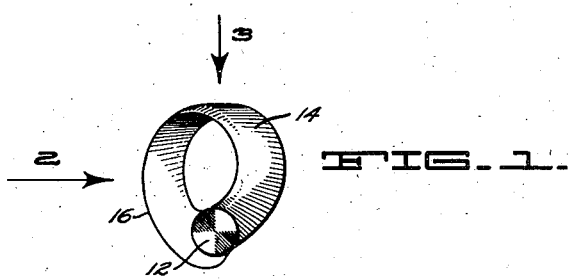
Figure 1 is an end elevation of a preferred form of the knife of my invention.
Figure 2:
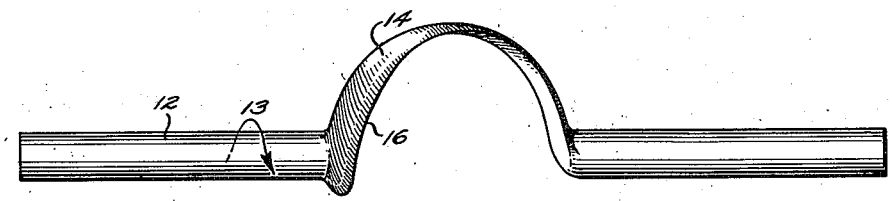
Fig. 2 is a side elevation of the knife, the arrow 2 in Fig. 1 indicating the direction from which the knife is viewed.
Figure 3:
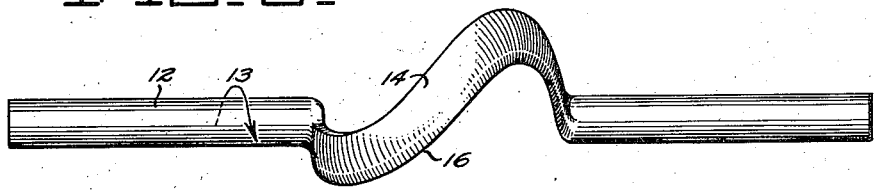
Fig. 3 is a plan of the knife, the arrow 3 in Figure 1 indicating the direction from which the knife is viewed.

Figures 1 and 2 show especially well the manner in which the blade of my knife rises from the shaft in the instant embodiment.

The cutting edge 16 adjacent the shaft extends substantially at right angles to the surface of the shaft and is substantially a true helix for a small portion of its angular advance. The pitch of the cutting edge 16 adjacent the shaft is very small. As the blade 14 departs from the shaft 12, however, the pitch increases until in the helicoidal portion which is offset from the shaft, the pitch is such that comparatively a rapid rate of cutting is produced with the same rotational speed.

In the operation of my knife, the half peach 6 with the contained pit 7 is positioned over the aperture 9 in the plate 8, as shown in Figure 4, and is held in place by the presser 11. With the peach so positioned, the shaft 12 is given a complete rotation. The cutting edge 15 of the blade 14 thereupon enters the peach and cuts the fleshy portion near the surface of the pit 7. The initial or entering movement of the blade is at comparatively a slow rate due to the low pitch and comparatively slow rise of the cutting edge 16. Hence, but a small portion of the blade enters the peach initially and a considerable amount of rotation is required to effect a substantial cut in the peach. The shock and load of initiating the cut are therefore small. As the shaft continues its rotation, successive portions of the blade enter the peach. Inasmuch as the blade is of helicoidal contour, the cutting is done at an angle to the plate 8 and progresses or advances in the direction of the axis of the peach as well as in the direction of rotation of the shaft 12. In that manner, the fibres of the peach flesh near the aperture 9 are not torn or pushed out of place but are sheared off cleanly.

If desired, force may be exerted on the shaft 12 tending to press the body portion of the blade 14 against the fruit pit. The cutting edge 16 will then follow quite closely very irregular contours of the peach and but little flesh will be left on the peach pit.

With the use of my knife, the edge fibres of the peach flesh are cut cleanly and the strain upon the peach and upon the machinery due to the initial entry of the cutting edge is gradual. The rate at which the cut is made is accelerated after the initial portion of the cut has been made thereby accomplishing in a short time the major portion of the cutting. By making the knife so that it moves in conformation to the contour of the peach pit, but little of the edible portion of the fruit is wasted and abnormally shaped pits will not be split and broken by the blade.

I claim:

1. A fruit pitting knife comprising a rotatable shaft, and a helicoidal blade on said shaft.

2. A fruit pitting knife comprising two axially alined shafts and a helicoidal blade interposed between and integral with said shafts.

3. A fruit pitting knife comprising a cutting portion substantially conforming to a helicoidal strip on the surface of an ellipsoid of revolution.

4. A fruit pitting knife for pitting peaches and the like comprising a shaft adapted to be disposed parallel to the axis of a peach to be pitted, and a blade on said shaft curved to have one portion enter the peach initially adjacent one end thereof and to have successive portions successively enter the peach as the shaft is rotated.

5. A fruit pitting knife for pitting peaches and the like comprising a rotatable shaft adapted to be disposed parallel to the axis of a peach to be pitted, and a blade on said shaft curved to cut initially at one end and successively toward the other end of said peach during rotation of said shaft.

6. A fruit pitting knife for pitting peaches and the like comprising a rotatable shaft parallel to the axis of the peach, and a helicoidal blade of varying pitch on said shaft and adapted during the uniform rotation of said shaft to cut said peach initially at a low rate and subsequently at an increased rate.

7. A fruit pitting knife for pitting peaches and the like comprising a rotatable shaft parallel to the axis of the peach, a helicoidal blade on said shaft, and a guiding portion for causing said blade to follow the contour of the peach pit.

In testimony whereof, I have hereunto set my hand.

HENRY JOHNSON.